United States Patent
Fueslein et al.

[15] 3,637,028
[45] Jan. 25, 1972

[54] OFFSET DISK HARROW

[72] Inventors: Jerome L. Fueslein, Linden; William M. Adams, Stockton, both of Calif.

[73] Assignee: International Harvester Company, Chicago, Ill.

[22] Filed: June 8, 1970

[21] Appl. No.: 44,453

[52] U.S. Cl............................172/582, 172/584, 172/654, 172/667, 172/319, 172/328
[51] Int. Cl..............................A01b 23/04, A01b 65/02
[58] Field of Search.................172/568, 569, 578, 582, 584, 172/600, 317, 320, 395–396, 417, 414, 407, 238, 241, 318, 319, 326–328, 677–680

[56] References Cited

UNITED STATES PATENTS

| | | | |
|---|---|---|---|
| 2,944,614 | 7/1960 | Shipp | 172/678 |
| 2,967,576 | 1/1961 | Garner | 172/600 |
| 2,886,115 | 5/1959 | Wadelton | 172/580 |
| 3,082,830 | 3/1963 | McKay | 172/328 |
| 3,572,445 | 3/1971 | Richey et al. | 172/581 |

Primary Examiner—Robert E. Pulfrey
Assistant Examiner—C. W. Hanor
Attorney—Floyd B. Harmon

[57] ABSTRACT

An offset disk harrow wherein the front and rear gangs are supported by a unitary frame structure to the ends of which each gang is connected by a single pivot, and wherein the frame structure includes articulated parts, one of which supports the rear gang and can be laterally angled relative to the other frame part and rigidly held in selected adjusted positions to laterally shift the rear gang bodily relative to the front gang.

5 Claims, 3 Drawing Figures

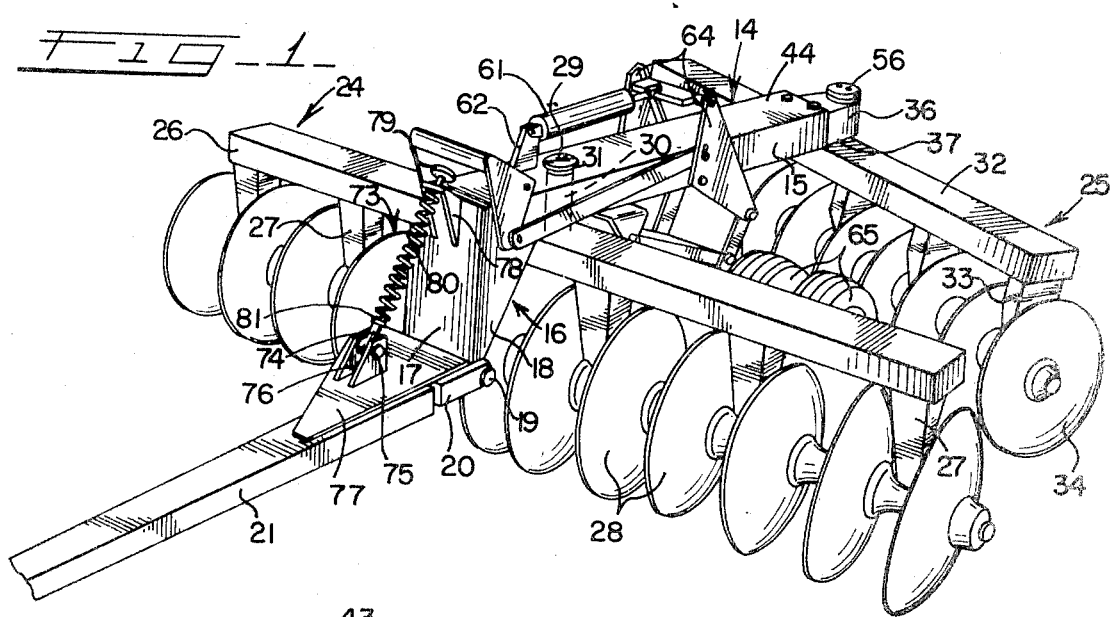
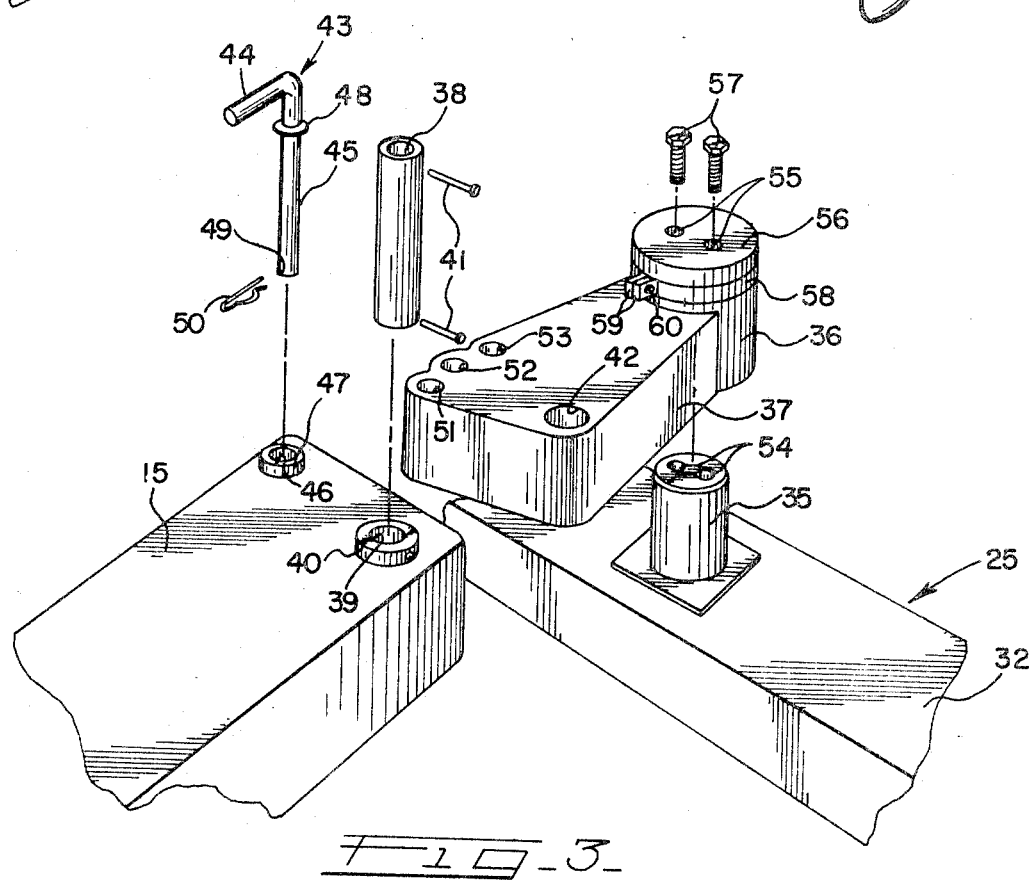
INVENTORS
JEROME L. FUESLEIN
WILLIAM M. ADAMS
BY
ATT'Y.

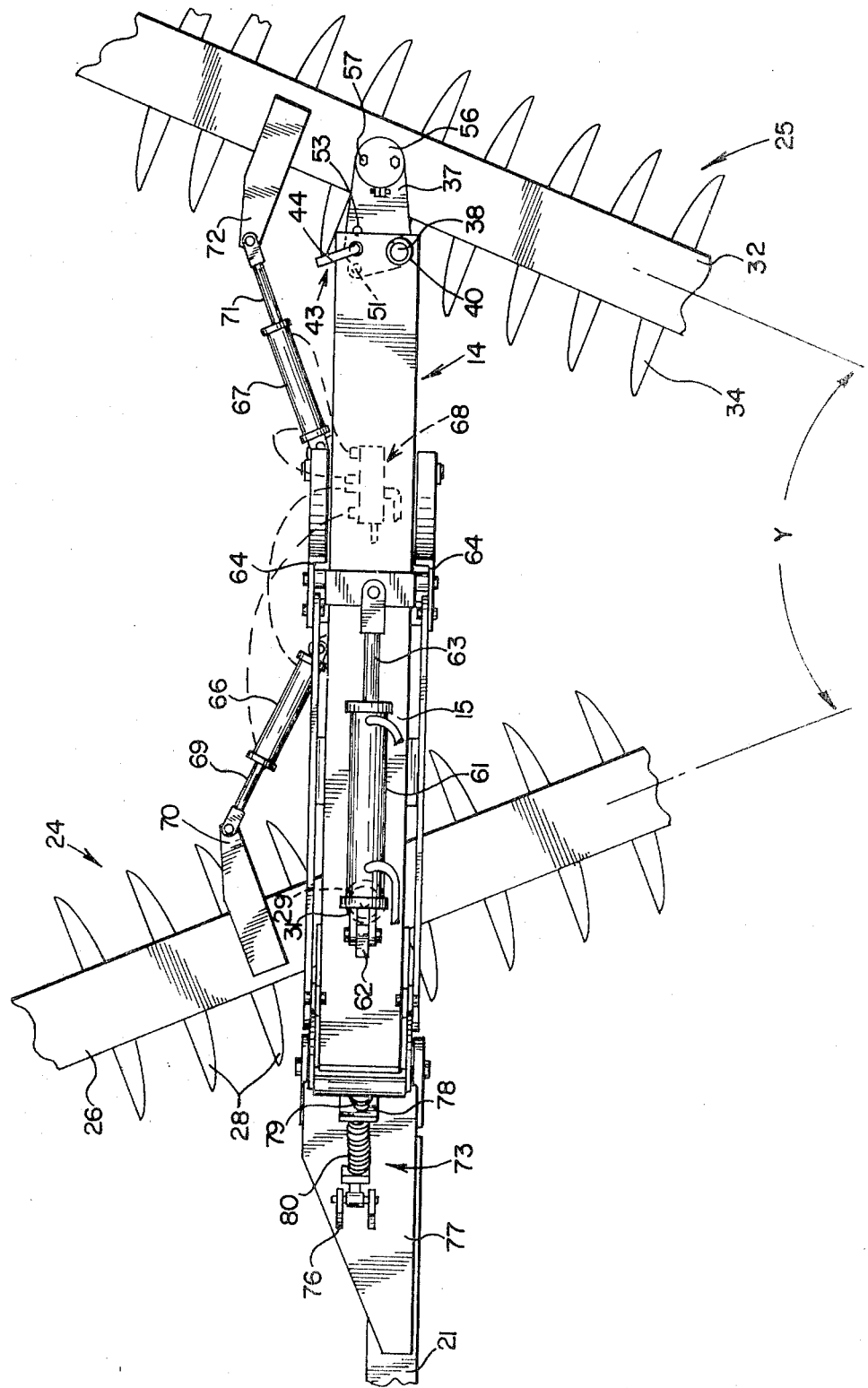

OFFSET DISK HARROW

BACKGROUND OF THE INVENTION

This invention relates to earth working implements and particularly to offset disk harrows. More specifically, the invention concerns an offset disk harrow of the wheel-controlled type.

The conventional offset disk harrow comprises a rectangular frame to which each disk gang is secured at laterally spaced locations by crude means involving the expenditure of considerable tome and labor to effect changes in the angular relationship of the gangs to meet soil requirements and operating needs. It is also frequently necessary, in order tor the rear gang to track properly behind the front gang, to laterally adjust the rear gang translationally relative to the front gang so that each disk of the rear gang tracks with respect to the corresponding disk of the front gang in such a way as to properly till all of the soil. With the conventional rectangular frame construction it is a major operation to improve the relationship of the rear disk to the front disks by laterally shifting one gang relative to the other.

An important object of the present invention, therefore, is to provide a simplified construction for a disk harrow of the offset type wherein the supporting frame is a unitary or single structure on which each disk gang is mounted by a single pivot.

Another object of the invention is the provision, in a disk harrow of the offset type wherein the disk gangs are adjustable to preselected angular relationships, of a unitary frame structure of novel construction upon which the disk gangs are mounted, including means facilitating lateral shifting of one gang relative to the other to improve the tracking of the disks of the rear gang relative to those of the front gang without altering the selected included angle between the gangs.

DESCRIPTION OF THE DRAWINGS

FIG. 1 is a perspective view, with parts removed, of an offset disk harrow embodying the features of this invention;

FIG. 2 is a plan view, with parts removed, of a portion of the implement shown in FIG. 1, and illustrating the structure of the unitary frame; and FIG. 3 is an enlarged exploded view in perspective of a portion of the structure shown in FIGS. 1 and 2.

DESCRIPTION OF THE PREFERRED EMBODIMENT

The disk harrow of this invention comprises a central longitudinally extending supporting frame assembly 14, which includes a generally rectangular hollow main frame member 15 to the forward end of which is affixed a depending bracket 16 having a forward face 17 and triangular sideplates 18.

The lower end of bracket 16 carries a transverse pivot pin 19 upon which are mounted a pair of ears 20 affixed to the rear end of a hitch member 21 and accommodating vertical swinging movement of the hitch member relative to the frame assembly 14, hitch member 21 being the means by which the implement is connected in draft receiving relation to a tractor.

A pair of front and rear disk gang assemblies 24 and 25, respectively, are provided and are substantial duplicates, the front gang comprising a transverse horizontal beam 26, rectangular in section and having a plurality of hangers 27 depending therefrom supporting axially aligned rotatable disks 28. Disk gang 24 is pivotally supported from main frame section 15 for horizontal angular adjustment relative thereto by the provision of a vertical spindle 29 affixed to beam 26 centrally thereof, in proximity with the lateral center of balance of the front disk gang 24, and projecting upwardly through an opening 30 provided in the forward portion of the main frame 15 and held against displacement by a removable collar 31.

It will be noted that the implement illustrated in the drawings is a right-hand offset disk harrow and that the disks of the front gang 24 face forwardly and outwardly to the right of the direction of travel. Rear gang 25 comprises a horizontal supporting beam 32, also rectangular in section, which diverges to the right with respect to front beam 26. A plurality of hangers 33 are secured to and depend from beam 32 and support at their lower ends a series of axially aligned disks 34 the concave faces of which are directed forwardly and outwardly to the left.

Rear gang 25 is mounted on the supporting frame assembly 14 for angular adjustment relative thereto and to the front gang by the provision of a vertical axis pivot comprising vertical spindle 35 centrally affixed to beam 32, in proximity with the lateral center of balance of the rear disk gang 25, and projecting upwardly therefrom for pivotal reception in the bearing portion 36 of the gang mounting member 37 forming part of the supporting frame 14. The forward portion of member 37 is slidably receivable in the hollow rear end of main frame member 15 and is pivotally mounted on a pivot pin 38 carried in an opening 39 in the rear end of member 15 and laterally offset from the centerline thereof.

Opening 39 terminates at each end in a boss 40, only one of which is shown, on upper and lower faces of member 15 to receive the ends of pivot pin 38, and each boss is apertured to receive a securing pin 41. Pivot pin 38 registers with an opening 42 in member 37, and the latter is made integral with member 15 by the provision of locking means in the form of a key or pin 43 having a handle 44 and a shank 45 (see FIG. 3) receivable in an opening 46 in member 15 and terminating at its upper end in a boss 47, engageable with a shoulder 48 formed on shank 45, the lower end of shank 45 having an opening 49 therein to receive a retaining cotter 50.

The gang mounting member 37 is angularly adjustable relative to frame member 15 about the axis of pivot pin 38 for a purpose hereinafter to become clear, and is rigidly held in its selected adjusted position by insertion of key 43 in one of a plurality of openings 51, 52 and 53 formed in member 37 on an arc having opening 42 as its center.

The upper end of spindle 35 has threaded recesses 54 which register with openings 55 in a cap 56 to receive bolts 57 to hold the disk gang against vertical displacement from frame 14. Cap 56 is spaced from the upper end of bearing portion 36 by a removable bail 58 having outwardly bent ends 59 connected by a bolt 60. To vertically adjust the position of the rear gang the spacer bail 58 may be removed and placed between beam 32 and the lower end of bearing portion 36.

In FIG. 2 of the drawings pin 43 is clearly shown inserted in central opening 52 in member 37, and the included angle between the gangs is indicated at "Y." In order to regulate the lateral position of the disks of the rear gang relative to the corresponding disks of the front gang to assure the proper working of the soil disturbed by the front gang it is necessary for the operator to laterally shift the rear gang bodily in one direction or the other relative to the front gang. Locking key 43 is removed and rear frame portion 37 is swung about the axis of pin 38 to effect translational movement of the rear gang until opening 46 registers with one of the openings 51 or 53, whereupon key 43 is reinserted above the selected opening.

To effect this lateral adjustment of the rear gang 25 it is preferable that the implement be elevated to a transport position above the ground. This is accomplished by mechanism forming no part of this invention as claimed, details of construction of which may be had by reference to copending U.S. application Ser. No. 44,454, filed June 8, 1970. However, for the purposes of this disclosure it might be noted that a hydraulic cylinder 61 is pivotally anchored to a lug 62 on the frame and has a piston rod 63 slidable therein and is supplied with fluid under pressure in well-known manner from the propelling tractor to rock a pair of bellcranks 64 which, in turn, are operatively connected to laterally spaced pairs of wheels 65 (see FIG. 1) to raise and lower the wheels by rocking the bellcranks 64.

The front and rear disk gangs are adjusted about the axes of the respective mounting spindles 29 and 35 to the desired angular relationship for operation, as for example the included angle "Y" indicated in FIG. 2, by the provision of extensible and retractable means connected between the frame and the individual gangs. These may be in the form of turnbuckles or the like but preferable are hydraulic cylinders, as indicated at 66 and 67, receiving fluid under pressure by control means on the tractor in a manner well known in the art and operable independently of the control means for lifting cylinder 61, fluid from the tractor being directed to cylinders 66 and 67 through the intermediary of directional valve means mounted on the implement frame and indicated diagrammatically at 68 in FIG. 2, the constructional details of the valve and the manner in which the fluid is distributed forming no part of the invention as claimed herein.

However, it may be noted that cylinder 66 is pivotally anchored to frame member 15 and a rod 69, slidable therein, is connected to a bracket 70 affixed to beam 26, and serves to adjust the angle of front gang 24.

Cylinder 67 is pivotally anchored to member 15 and has a piston rod 71 slidable therein and connected to a bracket 72 affixed to rear beam 32.

Extension and retraction of piston rods 69 and 71 in the respective cylinders 66 and 67 adjusts the gangs to the desired operating angle "Y." This is easily done after the implement has been raised to its transport position by lowering wheels 65 relative to the frame. In this position as well as in the operating position angular movement of the implement about the axis of pivot pin 19 is limited by the provision of leveling means indicated at 73 and including a bolt 74 pivoted at one end on a pin 75 carried by lugs 76 mounted on a plate 77 affixed to hitch 21. The other end of the bolt is slidable in an opening in a lug 78 affixed to the face 17 of bracket 16 and is provided with a head 79 engageable with the lug, and a compression spring 80 surrounds the bolt between lug 78 and a collar 81.

With the implement in its raised or transport position the rear gang may now be adjusted laterally, and this is accomplished by the mechanism of this invention while maintaining the same included angle "Y" previously selected for the operating angle between the gangs so that further adjustment thereof is unnecessary. Locking key 43 is removed to allow the rear gang 25 to be swung, for example clockwise, as viewed in FIG. 2, with gang mounting member 37 pivoting about the axis of pivot pin 38 while the gang is held by cylinder and piston rod unit 67, 71. A line between the axis of pivot pin 38 and the axis of spindle 35 connecting rear gang 25 to rear frame portion 37 then serves as one link of a generally parallel link system in which cylinder 67 and its piston rod 71 constitute the other link. Since rear gang 25 is held by the cylinder and piston unit, relative angular movement occurs between bearing 36 and spindle 35 to compensate for the arc of travel of the gang-mounting member 37 about pivot pin 38. The rear gang thus shifts laterally without angular deflection to the selected adjusted position of the gang-mounting member 37 without impairing the established included angle " Y" between the gangs. Key 43 is then inserted in the opening 51 to lock the rear gang in its adjusted position.

It is believed that the construction and operation of the novel offset disk harrow construction of this invention will be clearly understood from the foregoing description.

What is claimed is:

1. In a tractor propelled offset disk harrow, front and rear disk gangs relatively angled in their operating position and converging to one side of the direction of travel, a frame structure having relatively forward and aft disposed portions, vertical pivot means connecting one of said gangs to one of the frame structure portions, a gang-mounting structure mounted on the other frame structure portion being selectively adjustable laterally of the frame structure, vertical axle pivot means connecting the other gang with said mounting structure for lateral adjustment therewith, and means connected between the frame structure and said other gang to selectively vary the position thereof about said vertical axis pivot means, said other frame structure portion is a hollow member and said gang-mounting structure is slidably received therein and is pivotally connected thereto, an opening formed in said other frame structure and a plurality of registering openings provided in said gang-mounting structure on an arc about an axis of said pivotal connection and a locking pin optionally received in a set of registering openings.

2. The invention set forth in claim 1, wherein the means connected between the frame structure and said other gang is an extensible and retractable force transmission member pivotally connected at one end to the frame structure and at the other end to said other gang and forming with said gang-mounting structure a generally parallel link arrangement accommodating said lateral adjustment of the gang-mounting structure relative to said other frame structure portion while maintaining the included angle between said front and rear disk gangs.

3. The invention set forth in claim 1 wherein the means connected between said frame structure and said other gang is a rigid member adjustable in length pivotally connected at one end to the frame structure and at the other end to said other gang and forming with said gang-mounting structure a generally parallel link arrangement accommodating said lateral adjustment of the gang-mounting structure relative to said other frame structure portion while maintaining the included angle between said front and rear disk gangs.

4. In an offset disk harrow, a unitary frame structure having relatively forward and aft disposed portions, front and rear disk gangs relatively angled in their operating position and converging to one side of the direction of travel, vertical pivot means connecting one of said gangs to one of said frame structure portions in proximity with the lateral center of balance of said one of said gangs, a gang-mounting structure mounted on the other of said frame structure portions, vertical axis pivot means connecting the other gang with said mounting structure in proximity with the lateral center of balance of said other of said gangs, and means connected between the frame structure and the other gang to selectively vary the position thereof about said vertical axis pivot means
  said gang-mounting structure includes means for selectively adjusting the gang-mounting structure laterally of the frame structure,
  said other frame structure portion is a hollow member and said gang-mounting structure is slidably received therein and is pivotally connected thereto,
  an opening formed in said other frame structure and a plurality of registering openings formed in said gang-mounting structure on an arc about an axis of said pivotal connection and a locking pin optionally received in a set of registering openings.

5. The invention set forth in claim 4 wherein the means connected between the frame structure and said other gang is an extensible and retractable force transmission member pivotally connected at one end to the frame structure and at the other end to said other gang and forming with said gang-mounting structure a generally parallel link arrangement accommodating said lateral adjustment of the gang-mounting structure relative to said other frame structure portion while maintaining the included angle between said front and rear disk gangs.

* * * * *